(12) United States Patent
Norris et al.

(10) Patent No.: US 7,769,512 B2
(45) Date of Patent: Aug. 3, 2010

(54) VEHICLE STEERING CONTROL METHOD AND PERFORMANCE

(75) Inventors: William Robert Norris, Rock Hill, SC (US); Bernard Edwin Romig, Illinois City, IL (US); John Franklin Reid, Moline, IL (US); Brian Joseph Gilmore, Geneseo, IL (US)

(73) Assignee: Deere & Company, Moline, IL (US)

( * ) Notice: Subject to any disclaimer, the term of this patent is extended or adjusted under 35 U.S.C. 154(b) by 674 days.

(21) Appl. No.: 11/673,644

(22) Filed: Feb. 12, 2007

(65) Prior Publication Data
US 2008/0195281 A1 Aug. 14, 2008

(51) Int. Cl.
*B62D 6/00* (2006.01)
(52) U.S. Cl. .......................................... 701/44; 701/41
(58) Field of Classification Search .................. 701/41, 701/44, 27; 180/6.2; 700/50; 706/9
See application file for complete search history.

(56) References Cited

U.S. PATENT DOCUMENTS

| | | | |
|---|---|---|---|
| 4,758,959 A | 7/1988 | Thoone et al. |
| 5,163,530 A | 11/1992 | Nakamura et al. |
| 5,358,317 A | 10/1994 | Cikanek |
| 5,684,691 A | 11/1997 | Orbach et al. |
| 5,704,200 A | 1/1998 | Chmielewski, Jr. et al. |
| 5,863,105 A | 1/1999 | Sano |
| 5,875,108 A | 2/1999 | Hoffberg et al. |
| 5,901,246 A | 5/1999 | Hoffberg et al. |
| 5,940,814 A | 8/1999 | Jiang et al. |
| 5,968,103 A | 10/1999 | Rocke |
| 5,974,352 A | 10/1999 | Shull |
| 6,038,505 A | 3/2000 | Probst et al. |
| 6,041,320 A | 3/2000 | Qin et al. |
| 6,064,933 A | 5/2000 | Rocke |
| 6,070,118 A | 5/2000 | Ohta et al. |
| 6,081,750 A | 6/2000 | Hoffberg et al. |
| 6,125,314 A | 9/2000 | Graf et al. |
| 6,188,945 B1 | 2/2001 | Graf et al. |
| 6,208,981 B1 | 3/2001 | Graf et al. |
| 6,223,117 B1 | 4/2001 | Labuhn et al. |
| 6,233,515 B1 | 5/2001 | Engelman et al. |
| 6,317,686 B1 | 11/2001 | Ran |
| 6,321,153 B1 | 11/2001 | Rocke et al. |

(Continued)

OTHER PUBLICATIONS

Filla, Reno et al. "Dynamic Simulation of Construction Machinery Towards an Operator Model." NCFP 105-11.5 p. 429-438.

(Continued)

*Primary Examiner*—Yonel Beaulieu
(74) *Attorney, Agent, or Firm*—Yee & Associates, P.C.; Marilyn Smith Dawkins

(57) ABSTRACT

A vehicle steering control method including the steps of obtaining a heading error, obtaining a velocity value, obtaining a distance error, applying the heading error, inputting a measure of operator aggressiveness and defuzzifying an output from a steering rule base. The velocity value and the distance error are applied along with the heading error to fuzzy logic membership functions to produce an output that is applied to a steering rule base. A measure of the operator aggressiveness is input to the steering rule base. An output from the steering rule base is defuzzified to produce a steering signal.

18 Claims, 11 Drawing Sheets

U.S. PATENT DOCUMENTS

| | | | |
|---|---|---|---|
| 6,353,785 B1 | 3/2002 | Shuman et al. |
| 6,385,519 B2 | 5/2002 | Rocke |
| 6,442,463 B1 | 8/2002 | Qiu et al. |
| 6,487,477 B1 | 11/2002 | Woestman et al. |
| 6,584,382 B2 | 6/2003 | Karem |
| 6,615,126 B1 | 9/2003 | Potter et al. |
| 6,735,515 B2 | 5/2004 | Bechtolsheim et al. |
| 6,813,562 B2 | 11/2004 | Altan et al. |
| 6,925,425 B2 | 8/2005 | Remboski et al. |
| 7,039,551 B2 | 5/2006 | Shu et al. |
| 7,124,027 B1 | 10/2006 | Ernst et al. |
| 7,263,419 B2 | 8/2007 | Wheals et al. |
| 7,389,178 B2 | 6/2008 | Raz et al. |
| 7,561,054 B2 | 7/2009 | Raz et al. |
| 2002/0120371 A1 | 8/2002 | Leivian et al. |
| 2003/0065432 A1 | 4/2003 | Shuman et al. |
| 2003/0135290 A1 | 7/2003 | Yao et al. |
| 2003/0171869 A1 | 9/2003 | Potter et al. |
| 2003/0217021 A1 | 11/2003 | Jacobson |
| 2004/0158371 A1 | 8/2004 | Iggulden et al. |
| 2005/0149240 A1 | 7/2005 | Tseng et al. |
| 2005/0197994 A1 | 9/2005 | Fuji et al. |
| 2005/0273240 A1 | 12/2005 | Brown et al. |
| 2006/0080022 A1 | 4/2006 | Hrovat et al. |
| 2006/0200258 A1 | 9/2006 | Hoffberg et al. |
| 2006/0253240 A1 | 11/2006 | Rao et al. |
| 2007/0005212 A1 | 1/2007 | Xu et al. |
| 2007/0083318 A1 | 4/2007 | Parikh |
| 2008/0086248 A1 | 4/2008 | Lu et al. |
| 2008/0195569 A1 * | 8/2008 | Norris et al. ................. 706/52 |

OTHER PUBLICATIONS

Filla, Reno et al. "Using Dynamic Simulation in the Development of Construction Machinery." The Eighth Scandinavian International Conference on Fluid Power, SICFP'03, May 7-9, 2003, Tampere, Finland.

Singh, Sanjiv. "The State of the Art in Automation of Earthmoving." ASCE Journal of Aerospace Engineering, vol. 10, #4, Oct. 1997.

Larsson, Jonas. "Concepts for Multi-Domain Simulation with Application to Construction Machinery." 2001, Linkoping Studies in Science and Technology. Thesis No. 870. Institute of Technology, Linkopings Universitet, Division of Fluid and Mechanical Engineering Systems, Department of Mechanical Engineering, Linkopings Universitet, SE-581 83 Linkoping, Sweden.

Ericsson, Allan et al., "Mechanical Dynamics: A model for predicting digging forces when working in gravel or other granulated material." 15:th ADAMS European Users Conference, p. 1-9, 2000, Rome.

Norris, William R. et al. "Hierarchical Rule-Base Reduction For A Fuzzy Logic Based Human Operator Performance Model."

Norris, William R. "Disclosures."

Jamshidi et al., "Fuzzy Logic and Control: Software and Hardware Applications", Chapter 1, Introduction, PTR Prentice-Hall, Inc., Upper Saddle River, NJ, 1993, pp. iv-9.

USPTO final office action for U.S. Appl. No. 11/673,638 dated Dec. 15, 2009.

Shoreshi, R.A. Intelligent Control Systems. Modern Control Systems by M.K. Masten, Lesson 10, 1995. pp. 375-408.

W.R. Norris, et al. A Design Tool for Operator-Adaptive Steering Controllers. American Society of Agricultural Engineers. vol. 46(3): 883-891. Jun. 2003.

* cited by examiner though they are different in terms of level of efficiency, aggressiveness and sensitivity. Expert operators adapt very quickly to machine designs, including inadequate ones. The result is that qualitative design change effectiveness is not guaranteed since they are applied based on an operator's continuously adapting perception of the machine performance.

What is needed is an operator model that provides the ability to address design issue variables including response fidelity, accuracy and noise from sensory information, response time and required path based on aggressiveness and emission requirements.

SUMMARY OF THE INVENTION

The present invention provides a human perception model for the steering control of a vehicle.

The invention comprises, in one form thereof, a human perception model for a vehicle steering control method including the steps of obtaining a heading error, obtaining a velocity value, obtaining a distance error, applying the heading error, inputting a measure of operator aggressiveness and defuzzifying an output from a steering rule base. The velocity value and the distance error are applied along with the heading error to fuzzy logic membership functions to produce an output that is applied to a steering rule base. A measure of the operator aggressiveness is input to the steering rule base. An output from the steering rule base is defuzzified to produce a steering signal.

DETAILED DESCRIPTION OF THE INVENTION

Figure 1:
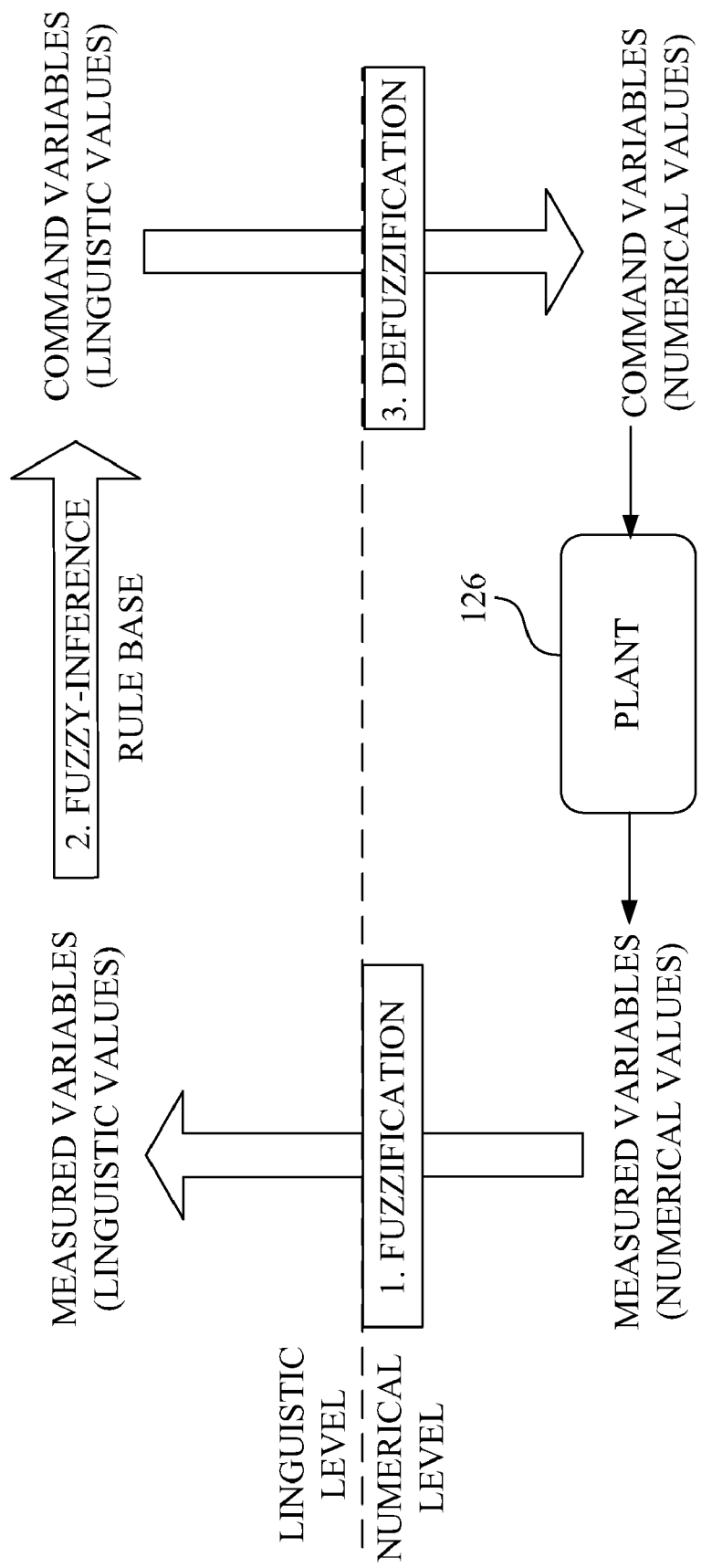
FIG. 1 is a schematic illustration of the use of fuzzy logic in an embodiment of the method of the present invention.
Figure 2:
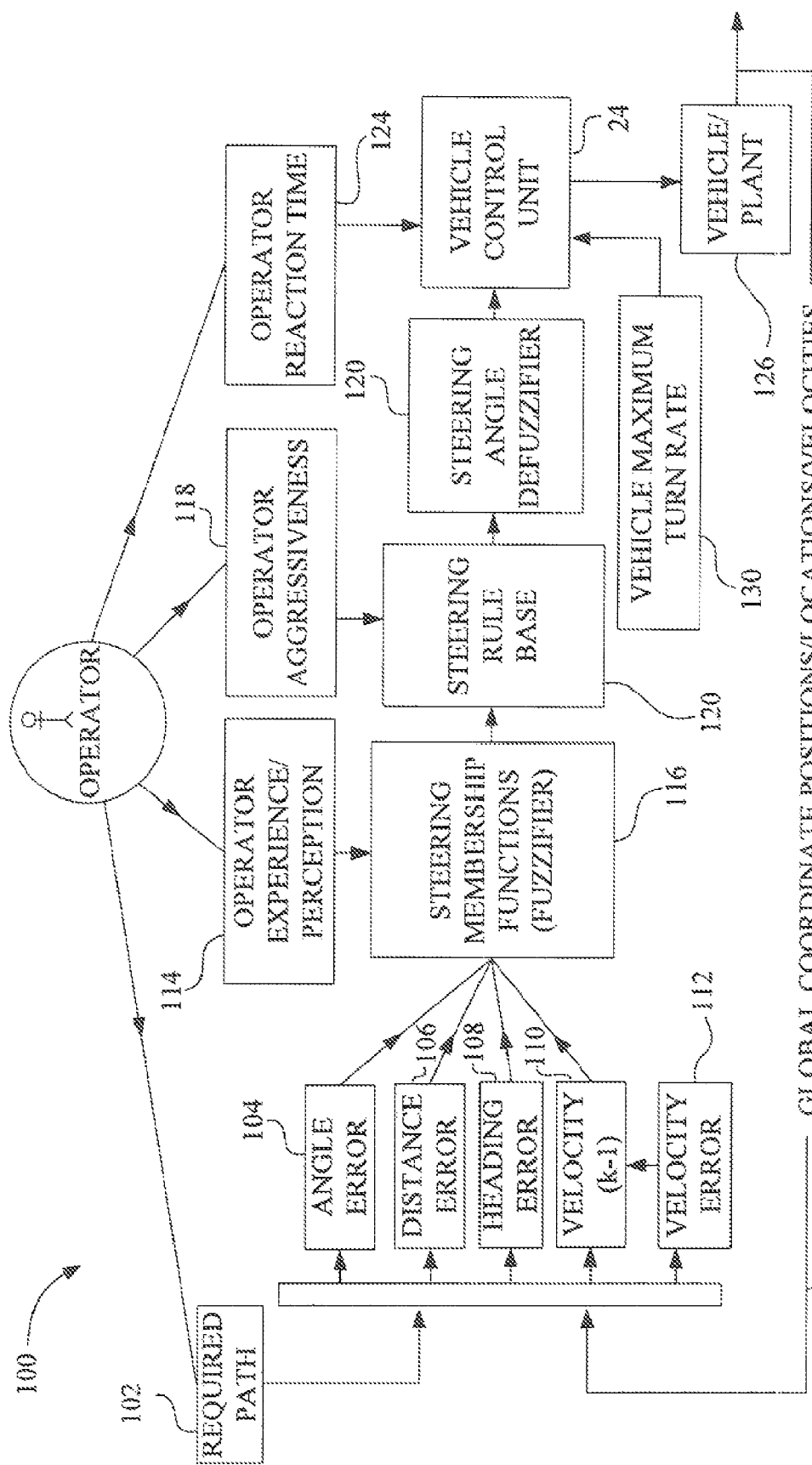
FIG. 2 schematically illustrates an embodiment of a human perception model of the present invention for the steering control of a vehicle.

Referring now to the drawings, and more particularly to FIGS. 1 and 2, there are shown schematic illustrations of an approach used in an embodiment of a human perception model for the steering control of a vehicle of the present invention. The goal is to approximate human operator performance characteristics, which is undertaken by the use of a fuzzy logic controller structure. The design of the virtual operator includes the fuzzification of the input variables, the application of the variables to a fuzzy inference and rule based construct, and the defuzzification of the output variables. The fuzzification step converts control inputs into a linguistic format using membership functions. The membership functions are based on the outputs from an error interpreter. The input variables to the model include several performance related measurable items. To reduce computational effort, linear approximations are implemented. A fuzzy membership function for the various linguistic variables are chosen to be pi-type or trapezoidal in nature.

As illustrated in FIG. 1, measured variables having numeric values are fuzzified into a linguistic format. A fuzzy-inference of these fuzzified variables is made by the application of a rule base resulting in command variables having a fuzzy format. These command variables are then defuzzified by converting the command variables to a numeric value that is interfaced with the control system of the vehicle plant. The vehicle responds causing a change in the location of the vehicle, which creates new measured variables based on the new location, and the method continues.

Figure 3:
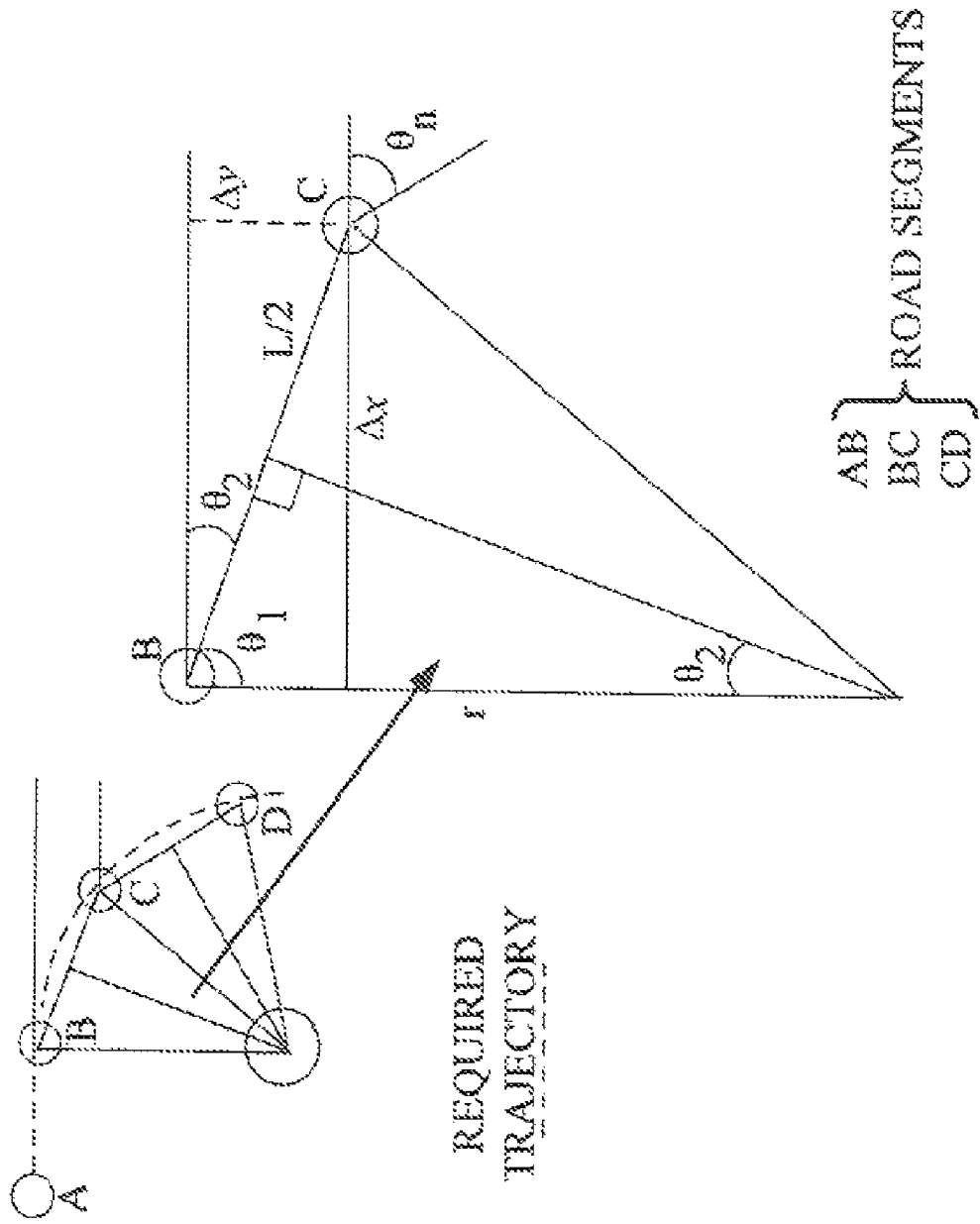
FIG. 3 illustrates a path of the vehicle of FIG. 2 along a preferred path.
Figure 4:
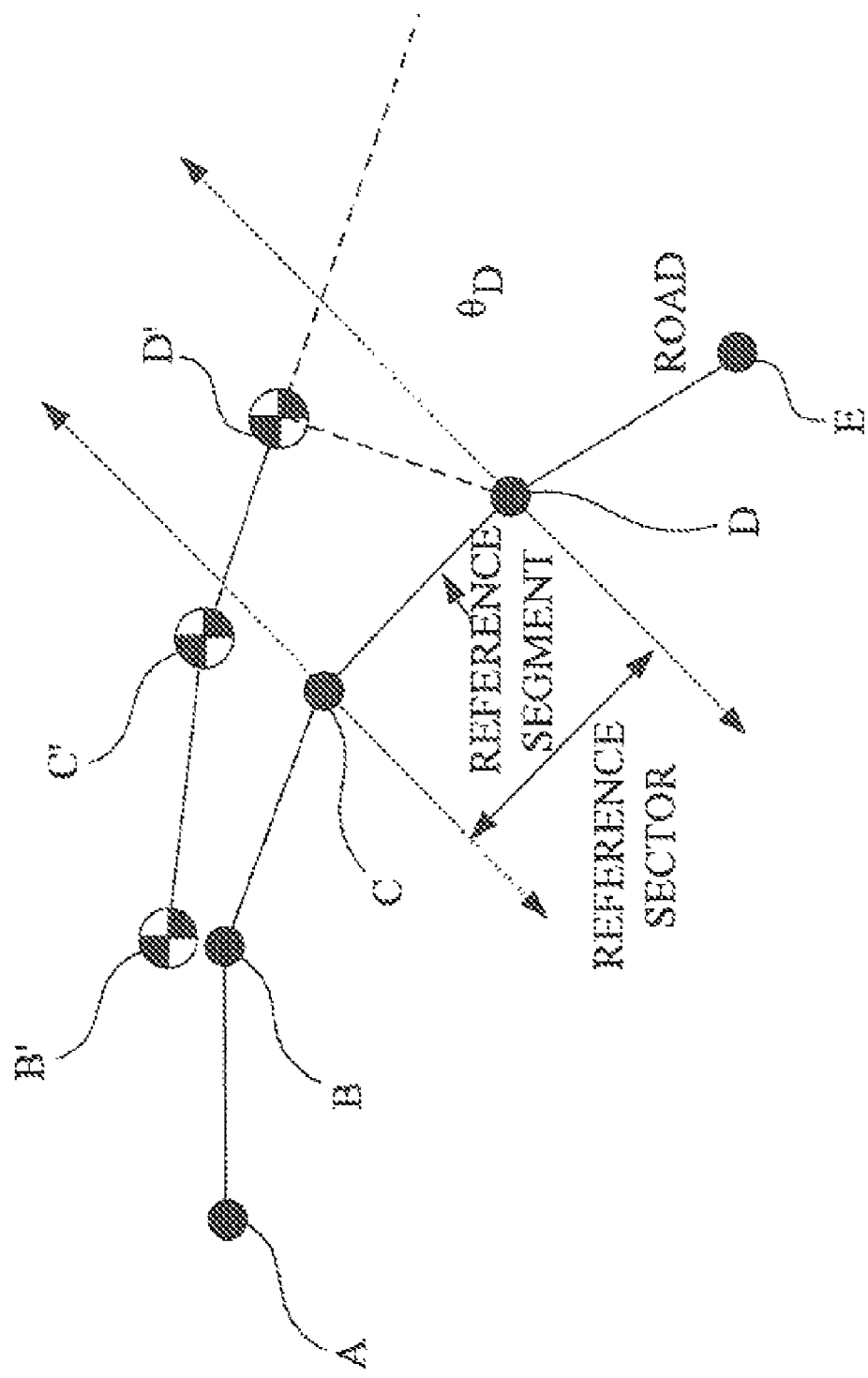
FIG. 4 illustrates a front angle error of the vehicle of FIG. 2 relative to a preferred course.

Now, additionally referring to FIGS. 3 and 4, the approach used for the operator model applies fuzzy logic to perception based modeling. This human model is developed for the purpose of a steering control function. When provided a path or segment, such as segments BC and CD, as shown in FIG. 3, it can be modeled as linear segments, arcs or clothoids and provides illustrations of the errors related to the control objective of following the path parallel to the trajectory at a minimum distance. The problem becomes multi-objective when the vehicle:

(1) Has initial conditions where the vehicle is outside of a given distance from the road or its heading varies from the path heading by a large degree.

(2) Deviates from the path by a large amount and similar error conditions arise either from obstacles or high speeds with dynamic changes resulting from such things as lateral slip.

As a result four errors are used as input to the operator model. The operator model is dependent on the errors, but independent of the method used to detect the errors or any set points. The errors are selected based on driver aiming behavior and includes front angle error, distance from the path, heading and vehicle speed. For ease of reference herein, each of these may be referred to as errors, including the velocity and steering angle even though they may otherwise not be thought of as such.

When a vehicle is traveling from B' to C' the distance from C to C' is larger than the distance from B to B' indicating that the vehicle is departing from the desired path of ABCDE. Further, the vehicle will depart farther at D-D'. This illustrates that the control system will implement a steering correction to reduce the deviation from the desired path ABCDE. It can be seen in FIG. 4 that the path of the vehicle is represented by B', C', D' and the required path is represented by A, B, C, D, E and that a distance between B-B', C-C', D-D' is illustrated as increasing. Further, the heading angle between the heading of the vehicle and the set point is illustrated as $\theta_D$. The present invention uses the distance error, the heading error, the velocity and steering angle in determining the necessary steering corrections for the vehicle to return the vehicle back to the desired path.

Now, additionally referring to FIGS. 5-9, the operator model of the present invention is dependent upon the errors, but independent of the method used to detect the errors or the set points. The errors are selected based on operator behavior such as aiming behavior, steering angle, distance from the path, heading and vehicle speed.

The first error, the front steering angle, can be thought of as the angle between a vector from the center of gravity to the front of the vehicle and the vector from the front of the vehicle to the end point of a current line segment such as B-C or of an arc therebetween. The distance error is the perpendicular distance from the vehicle to the path, and may have a sign value based on the vehicle location, such as right or left relative to the path. The heading error is the difference between the vehicle heading and the path segment/arc heading. Velocity is included to modulate the steering control to help reduce the effects of lateral slip and reduce the risk of roll over.

The controller is constructed as a rate controller, controlling the rate of steering correction given a particular error. The rules involved that are used by methods of the present invention may include the following rules:

If the error is large, increase the rate of correction.
If the error is small, reduce the rate of correction.
If the error is acceptable, take no corrective action.

Rate control has an advantage relative to human operator modeling and is very applicable for several reasons:

(1) It will work on a variety of platforms, independent of vehicle geometry, with little modification and will work independent of set points. It is dependent on a maximum rate of turn and sampling rates.

(2) It effectively models how most operator controls work, such as joysticks.

(3) It emulates how human operators control vehicle speed while maintaining a consistent steering control throughout a turn.

(4) The effect of discontinuities are reduced as each control action is discretely based on the current errors.

The control strategy for the system demonstrates the multi-objective nature of the controller. Like a human, certain errors can be disregarded depending on where the vehicle is located relative to where it has to go. For example, if the vehicle is far away from the path, the intent is to approach the path as soon as possible, so steering angle is used in the event that the distance is far away. This is logical for a human operator, for example if an operator is far away from a road he wishes to travel along, he will not consider traveling parallel to the road, but seek to minimize the distance from it as soon as possible. This rule set governs any vehicle position or orientation when the vehicle is considered far from the path and only applies rules related to distance as "far", relative to the front steering angle and speed. As the vehicle nears the road heading, it becomes important to again become parallel to the path and not overshoot the path. Vehicle speed is an important parameter here as it influences the rate of correction. Too fast of a rate of steering correction with too fast of a speed will result in unstable tracking as well as the possibility of roll over. Human operators slow down for turns for the same reason. Using a method known as fuzzy relation control strategy (FRCS) the rule base is minimized for control of the vehicle.

The operator model addresses the fidelity of the response, accuracy and noise from sensory information, response time, control set points based on aggressiveness and mission requirements, output scaling is based on operator aggressiveness, and operator experience, perception and judgment. The model addresses these elements through the use of applied gains and changes to the membership function linguistic variables.

Figure 5:
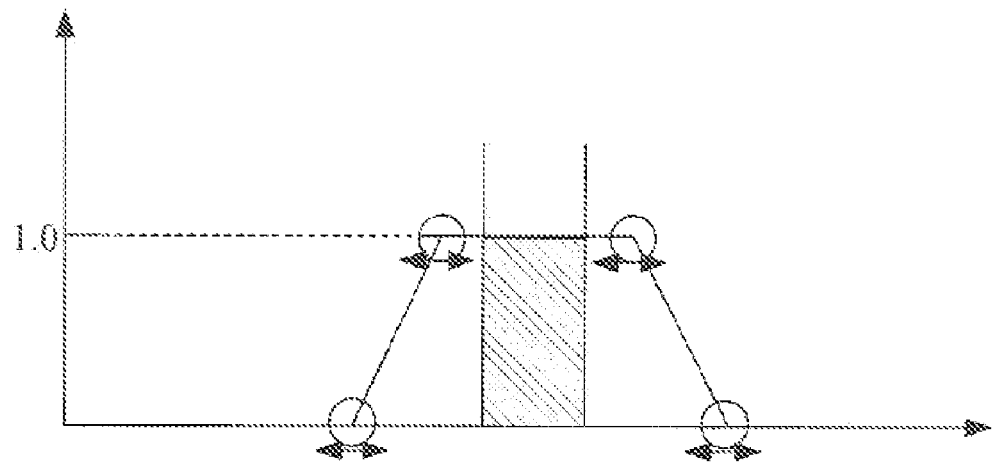
FIG. 5 schematically illustrates a rule used by the performance model of the present invention.
Figure 6:
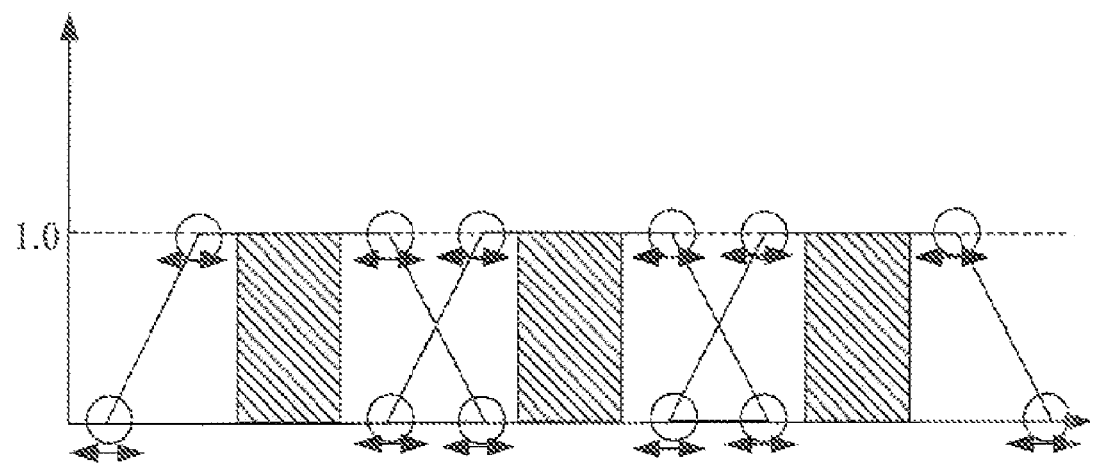
FIG. 6 illustrates the application of several rules used by the performance model of the present invention.
Figure 7:
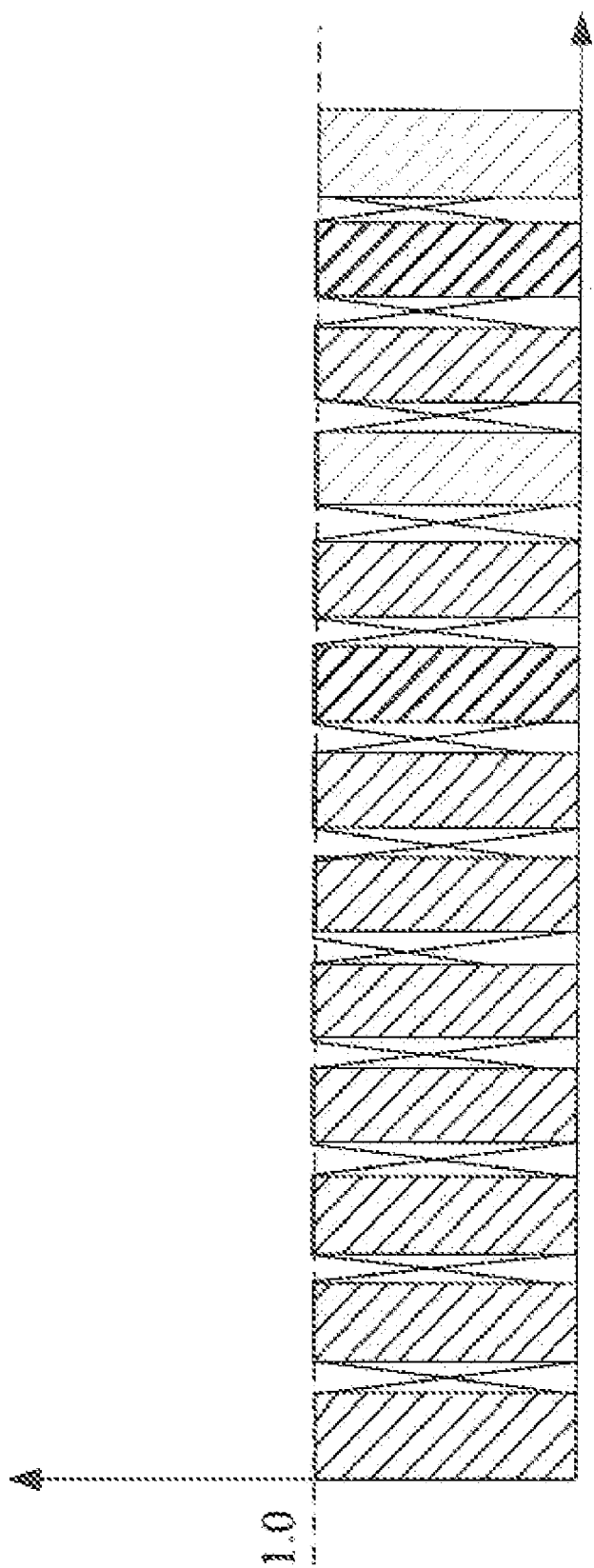
FIG. 7 illustrates even more certainty by the including of rules in the performance model of the present invention.

The membership functions of the fuzzy system represent how the model interprets error information. Trapezoidal membership functions, such as those shown in FIGS. 5-7 represent regions where the operator is certain of an interpretation, or error classification. Trapezoids are used in FIGS. 5-7 to provide a visual illustration of the membership functions. For a human operator it is almost impossible to measure error exactly, even more so for an inexperienced operator. A regional approach to error classification is most applicable to the present invention. For example, a human operator cannot determine that he is exactly 5 meters from a wall unless he measures the distance with some measuring device. However, depending on the situation, he can determine he is far away from the wall. What is uncertain is where "far" changes to a "near" classification or where the transition region between error classifications occurs. These transitions are illustrated as angled portions of the trapezoids. A triangular, or a Gaussian distribution with a small standard deviation, membership function by itself is inappropriate in this approach. However, continuing with the regional approach, experience/judgment can be incorporated and represented in two ways. The first is an increase in the number of linguistic variables, or perception granularity, depending on the fidelity required for adequate control. The second aspect is that smaller transition regions between the linguistic variable error classifiers improve system performance. Inexperience and errors in interpreting the information are represented in this model by linguistic variables with extended transition regions such as that shown in FIGS. 5 and 6 and/or by shifting the regions covered by the linguistic variables. This model lends itself very well to interpreting the inexact common noisy data from sensors as well as describing how humans make control decisions with uncertain information. The model uses a common sense rule base that remains unchanged, except in the event of improved perception granularity, where additional rules using the same control strategy would have to be applied. The response fidelity, perception, operator experience, accuracy, noise from sensory information and judgments are represented and are modifiable. Control set points can be changed without effecting the controller operations using gains based on the operator level of aggressiveness and mission requirements. An output can also be scaled based on operator aggressiveness as the current system provides a signal between one and minus one. The output component of the rules within the rule base can also be modified to provide a more aggressive output.

In FIGS. 5-7 the region of certainty under all situations is illustrated by the shaded box. As the situation changes it shifts away from the region of certainty there is a decreasing likelihood that the rule is going to be effective, as illustrated by the sloped lines. In FIG. 6 as more rules are introduced, as compared to FIG. 5, there is less possibility of an uncertain circumstance. Further, more experience and/or a larger knowledge base, there is more interpretation and response granularity, that yields smaller, less fuzzy transition regions between the rules, as illustrated in FIG. 7.

Figure 8:
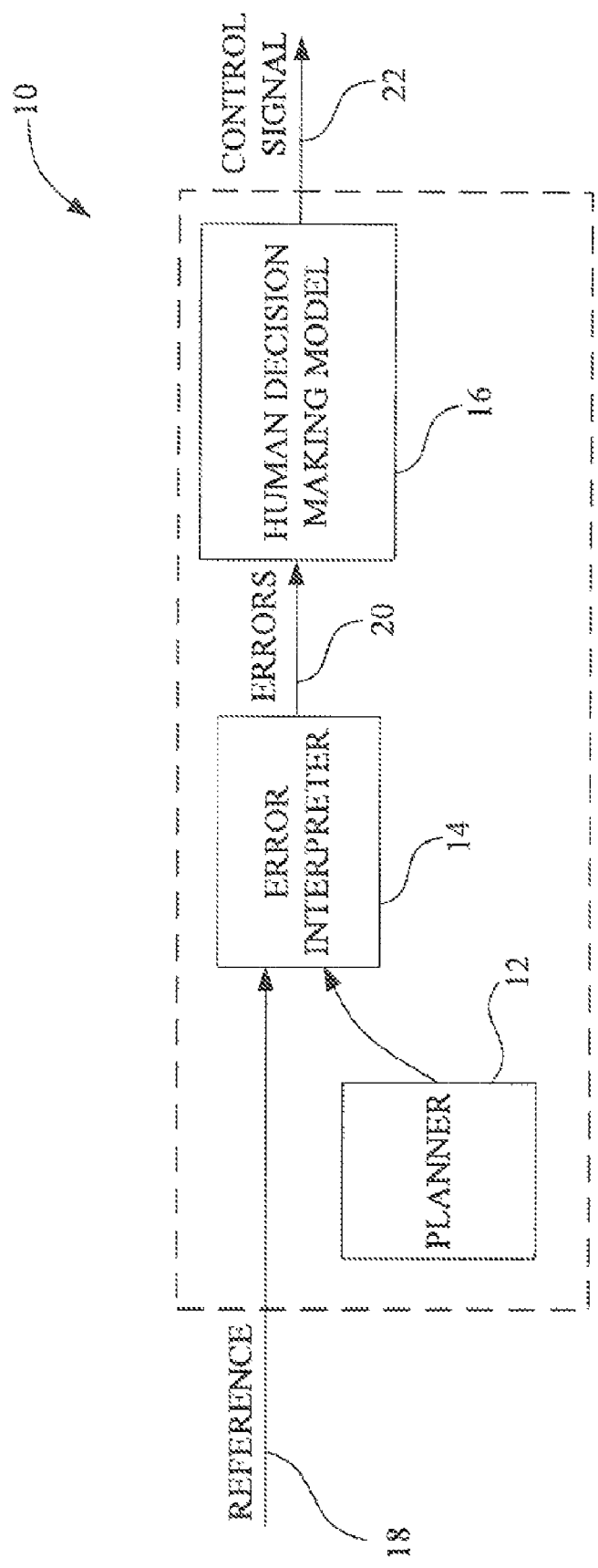
FIG. 8 is a schematic illustration of a human performance model of the present invention.

FIG. 8 schematically illustrates a performance model 10 including a planner portion 12, an error interpreter 14, and a human decision-making model 16. A reference signal 18, as well as set points from planner 12, are utilized by error interpreter 14 to generate errors such as distance error, velocity error and it also utilizes current steering angle information. Error interpreter 14 generates errors 20 that are used by human decision-making model 16 to produce a control signal 22. Control signal 22 in this instance relates to the steering of the vehicle.

Figure 9:
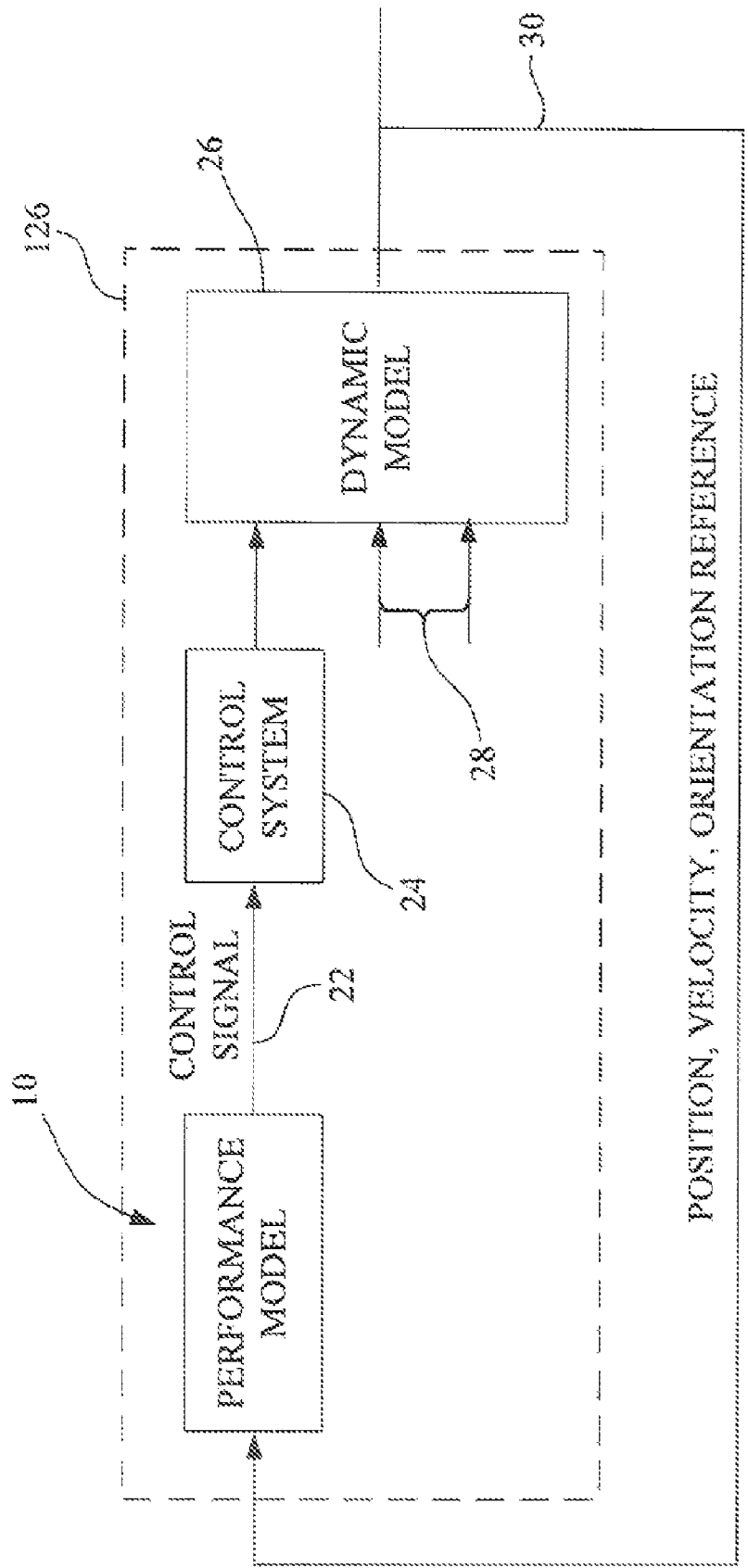
FIG. 9 schematically illustrates a vehicle utilizing the performance model of FIG. 8.

In FIG. 9 performance model 10 feeds control system 24 a control signal 22. Control system 24 provides input into dynamic model 26. Dynamic model 26 may include other inputs 28 other than steering information, such as speed information that may be input on other inputs 28. An output signal from dynamic model 26 is generated and a feedback reference signal 30, which feeds back to reference signal 18, indicates the position, velocity, acceleration and orientation of the vehicle.

As illustrated in FIG. 2, a method 100 obtains information from an operator that includes a required path 102, which may include set points necessary to establish the desired path for a vehicle 126. An angle error 104, also known as a steering angle 104 along with distance error 106, heading error 108 and velocity 110 serve as inputs to fuzzification portion 116. Fuzzification portion 116, also known as steering membership functions 116, utilizes steering membership functions to interpret the inputs to generate output information for use in a steering rule base 120. Operator experience and perception 114 are also input into steering membership functions 116. Fuzzification portion 116 utilizes the steering membership functions to interpret the inputs to generate output information for use in steering rule base 120. Operator aggressiveness 118 is also input into rule base 120, the output thereof is provided to steering defuzzifier 122 that results in an input signal to a vehicle control unit 124. Vehicle control unit 124 also has a vehicle maximum turn rate 130 input thereto in order to calculate the steering information that is passed onto vehicle 126 to control vehicle 126. Maximum turn rate 130 is used to prevent turn-over and reduce or eliminate lateral slip of vehicle 126. Global coordinate positions, location, velocity, acceleration and orientation of vehicle 126 are sensed and fed back as a reference by way of feedback loop 128. The information returned in feedback loop 128 is utilized and compared to the required path 102 to generate steering angle 104, distance error 106, heading error 108, velocity 110 and velocity error 112.

The steering angle 104, distance error 106, heading error 108 and velocity 110 are utilized as inputs to fuzzifier portion 116, that corresponds to error interpreter 14 of FIG. 4. Operator experience/perception 114, operator aggressiveness 118 and operator reaction time 124 are set by a gain control method. Steering angle 104 may be determined by steering sensors located on vehicle 126. Distance error 106, heading error 108, velocity 110 and velocity error 112 are determined from mathematical combinations of the information from feedback loop 128 and from required path 102 and may be done discretely by way of set points as illustrated herein.

Human perception provides an inexact estimation of error. Exact error measurements are not possible by a human; however, humans can readily determine if an error is acceptable, close or far away from an objective based upon experience. Boundaries between error classifications are where the uncertainty occurs. The trapezoidal representation incorporates the imprecise classification in their transitional sloped areas. The flat areas at the top of the trapezoids represent a region of certainty.

The membership functions used in block 116 are tuned to minimize the distance variation from a given trajectory at an optimal or near optimal speed. The tuned membership functions, for example, can have three linguistic variables in an attempt to minimize computational effort. When additional granularity in the membership functions is needed it can be introduced if necessary. To illustrate the three linguistic variables, the error can be described as "acceptable", "close" or "far" from an objective based on experience. These terms are common to a human operator and are utilized by the fuzzy logic control system of method 100.

The rule base is derived based on heuristic knowledge. A hierarchical technique is used based on the importance of the inputs relative to their linguistic variable regions. The hierarchy is drawn from the controller objects. The object for the fuzzy logic controller is to provide a steering signal to bring the vehicle to a desired path. In order to incorporate the information, a fuzzy relations control strategy (FRCS) is utilized. The error values are the fuzzy relations control variables (FRCVs). The FRCS applies to an approach with a control strategy that is incorporated into the fuzzy relations between the controller input variables. The FRCS is developed because the problem is multi-objective, where the current object depends on the state of the system and it results in a different control strategy. The control strategy is to steer vehicle 126 to minimize the distance from a trajectory in as short a time as possible, to avoid lateral slip and to avoid roll over of the vehicle. The current steering angle of the vehicle incorporated as block 104 is input into fuzzification portion 116 to classify the steering angle. If the vehicle distance is far from a required path and the primary objective is to approach the required path as quickly as possible without spending excessive control energy, the vehicle steering may have an acceptable value that is higher than an acceptable value when the vehicle closely approaches the required path. As such, the definition of acceptable steering is different when the vehicle is a far distance from the required path than it is when the vehicle is a short distance from the path.

The FRCS employed in forming the rule base includes a complete set of control rules for all speed and/or steering conditions. The size of the rule base is generally reduced by approximately 98% by ignoring the extra rules irrelevant to the control strategy.

Defuzzifying the output of rule base method 120 occurs at step 122 to derive a non-fuzzy or crisp value that best represents the fuzzy value of the linguistic output variable. One method that can be utilized is known as the center of area technique to result in a discrete numeric output.

Figure 10A:
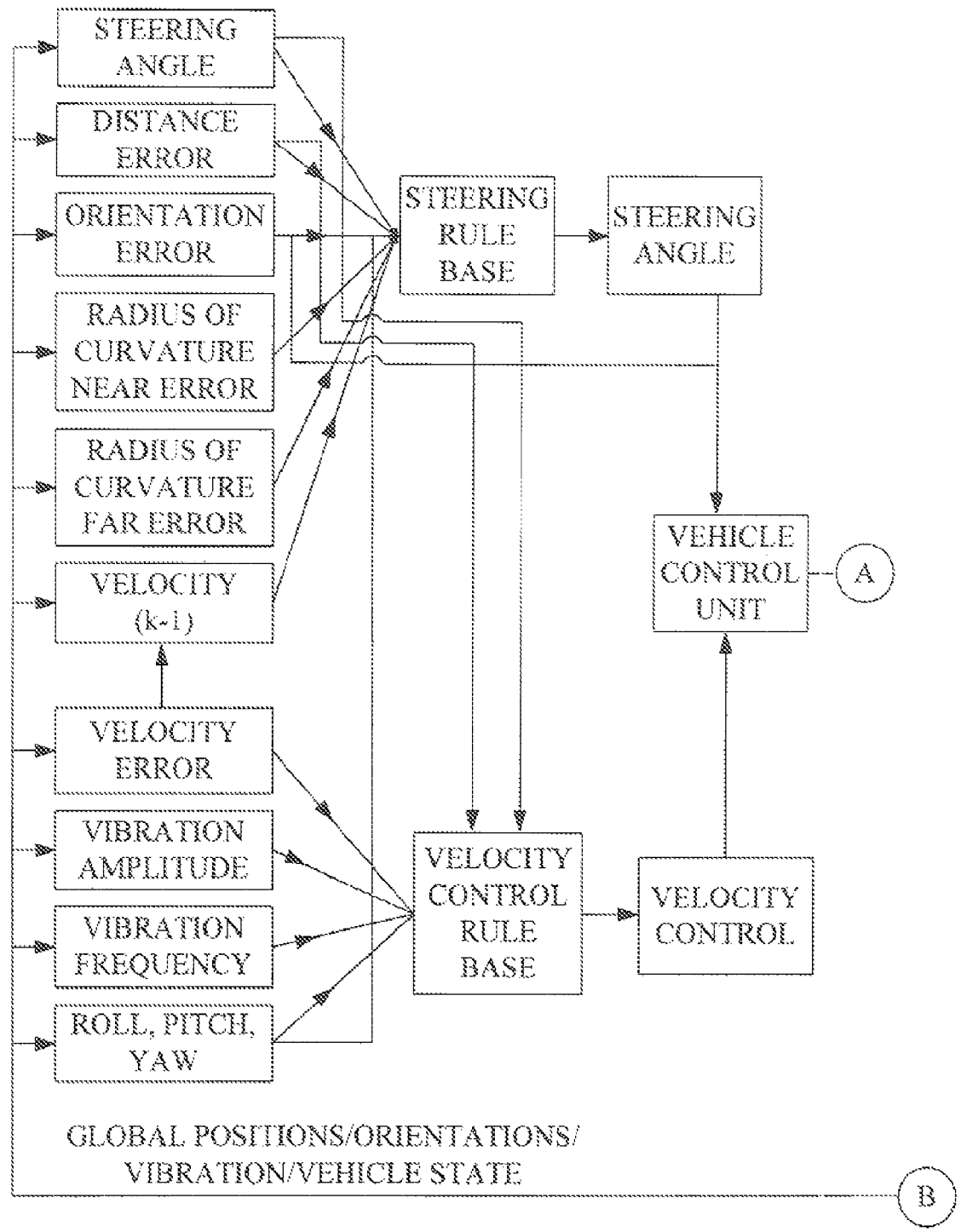
FIG. 10A-C schematically illustrates another embodiment of a fuzzy control system of the present invention.
Figure 10B:
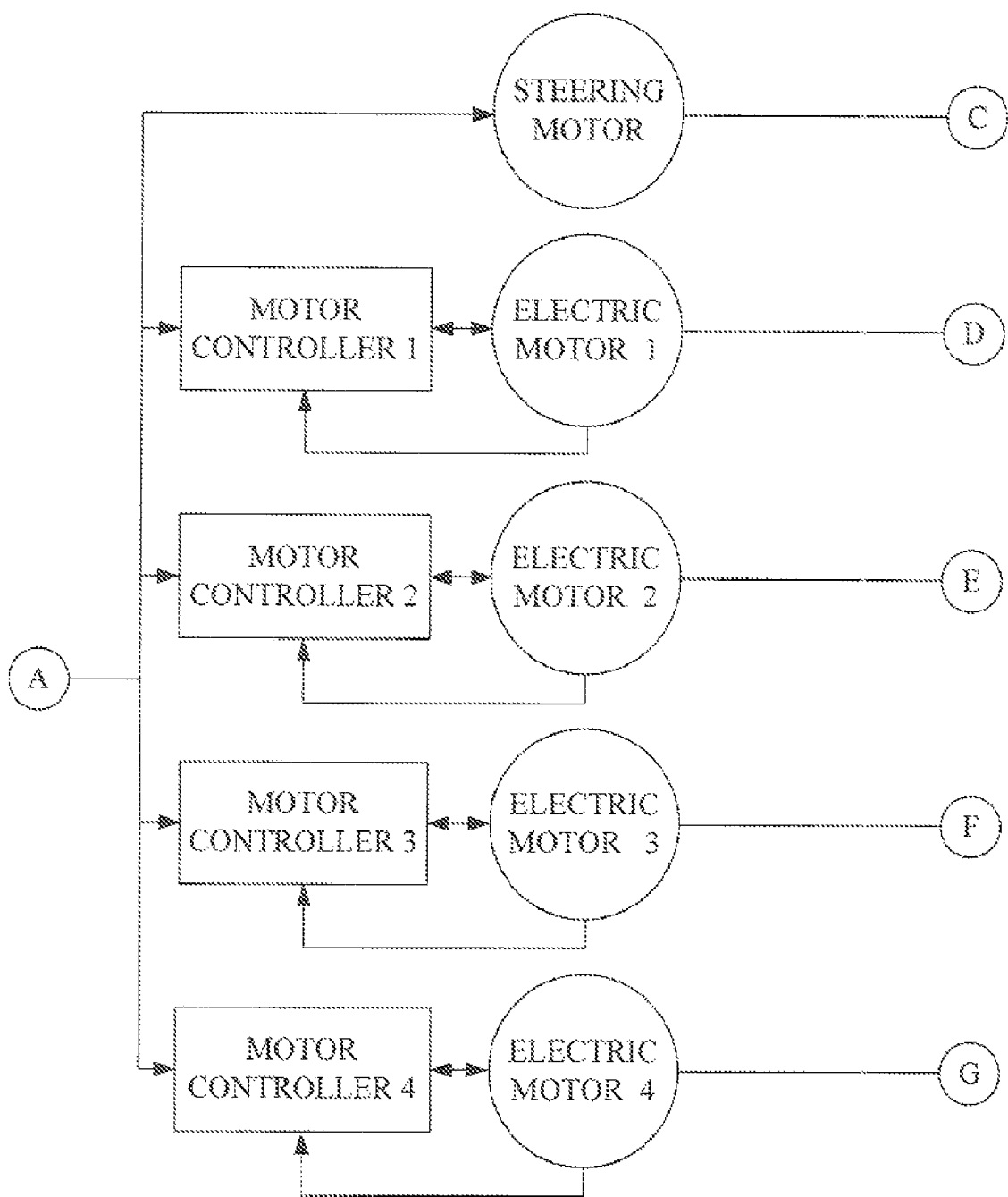
Figure 10C:
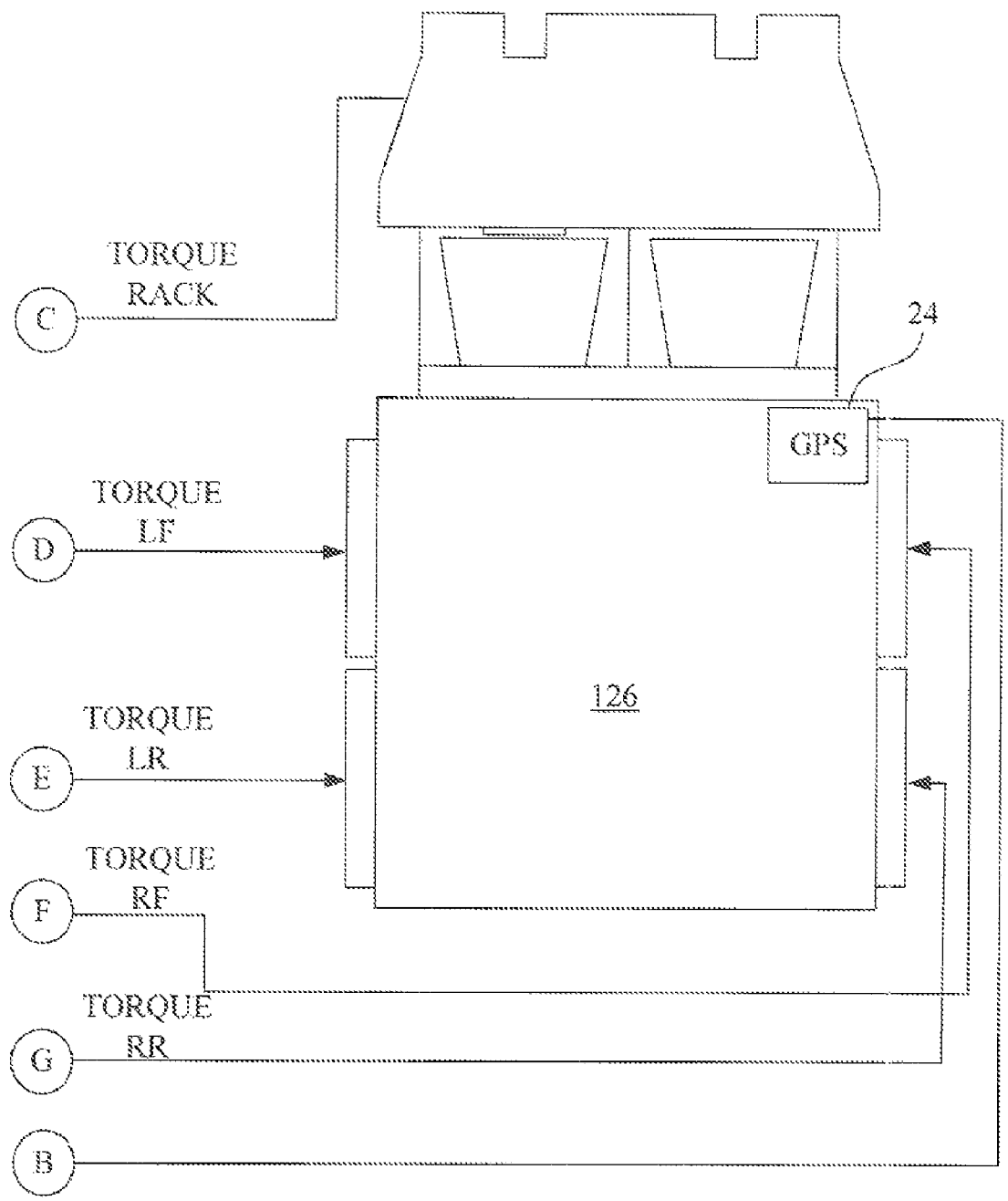

Now, additionally referring to FIGS. 10A-C, there is illustrated another embodiment of the present invention including inputs to both steering and velocity fuzzy control rule bases that result in vehicle control signals that are interpreted and applied to each of four drive motors and a steering motor. The vehicle schematically illustrated has four drive wheels that are independently speed controlled and a steering motor that is used to guide the steering mechanism of the vehicle. Inputs, in addition to those discussed above, are used in this fuzzy rule base system, such as vibration amplitude, vibration frequency and the roll, pitch and yaw of the vehicle. Although shown in a schematic form apart from vehicle 126 it is to be understood that the elements depicted in FIGS. 10A and 10B are normally functionally located on vehicle 126. The model can also be used apart from a vehicle for simulation purposes.

The human perception model for steering control results in a qualitative optimization of the man-machine interface and a synergy between the operator and the machine. Additionally, it allows for a stability analysis for a wide range of operator behaviors since the gains of the inputs can be set to alter the experience and aggressiveness of the operator. The model allows for an optimization of the machine/control system to minimize energy consumption of the machine components based on a wide variety of operator behavior patterns. The human perception model results in an understanding of differences between operators, including varying efficiencies. This advantageously allows virtual rapid prototyping of control systems. The present invention leads to the development of autonomous, operator assisted, tele-operation, operator augmentation algorithms and human-machine interfaces. Additionally, the human operator model allows for understanding in determining of feed back requirements for drive-by-wire systems. Yet still further, the human perception model allows for development of sophisticated individual and personalizable operator controls and system response characteristics, thereby improving operator/machine synergy.

Having described the preferred embodiment, it will become apparent that various modifications can be made without departing from the scope of the invention as defined in the accompanying claims.

The invention claimed is:

1. A vehicle steering control method, comprising the steps of:
    obtaining a heading error;
    obtaining a velocity value;
    obtaining a distance error;
    applying said heading error, said velocity value and said distance error to fuzzy logic membership functions to produce an output that is applied to a steering rule base;
    inputting a measure of operator aggressiveness to said steering rule base;
    defuzzifying an output from said steering rule base to produce a steering signal;
    receiving said steering signal by a vehicle control unit; and
    steering a vehicle by said vehicle control unit using said steering signal.

2. The method of claim 1, further comprising the step of inputting an operator reaction time to said vehicle control unit.

3. The method of claim 1, further comprising the step of generating at least one of said heading error, said velocity value and said distance error by comparing a required path to a current position of the vehicle.

4. The method of claim 3, further comprising the step of using operator experience/perception information by said fuzzy logic membership functions.

5. The method of claim 1, further comprising the step of establishing a required path which serves as an input to said obtaining a distance error step.

6. The method of claim 5, wherein said establishing a required path step also serves as an input to said obtaining a velocity value step.

7. The method of claim 5, further comprising the step of using feedback information to establish a current position of the vehicle as an input to said obtaining a distance error step.

8. The method of claim 7, wherein said using feedback information step also serves as an input to said obtaining a velocity value step.

9. The method of claim 8, further comprising the step of obtaining at least one of an orientation, a location and a velocity to input to at least one of said obtaining a velocity value step and said obtaining a distance error step.

10. A vehicle steering control method, comprising the steps of:
    applying a steering angle, a velocity error and a distance error to fuzzy logic membership functions to produce an output that is applied to a steering rule base;
    inputting a measure of operator aggressiveness to said steering rule base;
    defuzzifying an output from said steering rule base to produce a steering signal;
    receiving said steering signal by a vehicle control unit; and
    steering a vehicle by said vehicle control unit using said steering signal.

11. The method of claim 10, further comprising the step of inputting an operator reaction time to said vehicle control unit.

12. The method of claim 10, further comprising the step inputting a maximum turn rate of the vehicle to said vehicle control unit.

13. The method of claim 12, further comprising the step of using operator experience/perception information by said fuzzy logic membership functions.

14. The method of claim 10, further comprising the step of establishing a required path which serves as an input to obtain said distance error.

15. The method of claim 14, wherein said establishing a required path step also serves as an input to obtain said velocity error.

16. The method of claim 14, further comprising the step of using feedback information to establish a current position of the vehicle to obtain said distance error.

17. The method of claim 16, wherein said feedback information also serves as an input to obtain said velocity error.

18. The method of claim 17, further comprising the step of obtaining at least one of an orientation, a location and a velocity in said using feedback information step.

* * * * *